(12) United States Patent
Dielschneider et al.

(10) Patent No.: US 6,515,474 B1
(45) Date of Patent: Feb. 4, 2003

(54) LINEARIZED MAGNETIC DISPLACEMENT SENSOR

(75) Inventors: Nile K. Dielschneider, Conrad; John P. Dilger; Donald P. Pepperling, both of Marshalltown, all of IA (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/454,801

(22) Filed: Dec. 3, 1999

Related U.S. Application Data (63) Continuation-in-part of application No. 08/906,773, filed on Aug. 6, 1997.

(51) Int. Cl.$^7$ ................................................. G01B 7/14
(52) U.S. Cl. ............................. 324/207.24; 324/207.22
(58) Field of Search ........................ 324/207.24, 207.2, 324/207.22, 207.21, 207.23, 207.25, 207.26, 260, 262; 338/32 H, 32 R (56) References Cited

U.S. PATENT DOCUMENTS

| | | | |
|---|---|---|---|
| 3,112,464 A | 11/1963 | Ratajski et al. | 338/32 H |
| 4,532,810 A | 8/1985 | Prinz et al. | 73/717 |
| 4,570,118 A | 2/1986 | Tomczak et al. | 324/207.2 |
| 4,585,029 A | 4/1986 | Harding | 137/625.62 |
| 4,665,362 A | 5/1987 | Abel et al. | 324/207.2 |
| 4,870,864 A | 10/1989 | Io | 73/517 R |
| 4,935,698 A | 6/1990 | Kawaji et al. | 324/207.2 |
| 5,359,288 A | 10/1994 | Riggs et al. | 324/207.22 |
| 5,497,081 A | 3/1996 | Wolf et al. | 324/207.12 |
| 5,570,015 A | 10/1996 | Takaishi et al. | 324/207.21 |
| 5,572,132 A * | 11/1996 | Pulyer et al. | 324/318 |
| 5,955,881 A * | 9/1999 | White et al. | 324/207.24 |

FOREIGN PATENT DOCUMENTS

| | | |
|---|---|---|
| EP | 0 059 733 B1 | 9/1982 |
| GB | 801966 | 9/1958 |
| GB | 872 072 A | 7/1961 |
| GB | 154 340 A | 8/1985 |

OTHER PUBLICATIONS

Patent Abstracts of Japan, vol. 15, No. 115, Mar. 19, 1991, JP 03 004123 A.
Patent Abstract of Japan, vol. 18, No. 504, Sep. 21, 1994, JP 06 176916 A.

* cited by examiner

*Primary Examiner*—Jay Patidar
(74) *Attorney, Agent, or Firm*—Kinney & Lange, P.A.

(57) ABSTRACT

A displacement sensor includes a magnet assembly having a housing for mounting to one of first and second relatively moveable elements. A magnet assembly is mounted to one element and defines a longitudinal space having an axis along its length. The magnet assembly includes at least one magnet having a north and a south pole that supply fringing magnetic flux in the longitudinal space and a flux-shaping pole piece on each of the north and south poles. A magnetic field sensor assembly has a housing for mounting to the other of the first and second elements for movement along an axis in the space parallel to the magnet assembly. In one embodiment, each of the flux-shaping pole pieces has a pentagon shape in a plane of primary flux pattern, forming a first face confronting the longitudinal space between the first and second magnets. In another embodiment, the magnet is a cylindrical magnet adjacent the longitudinal space, and the first face of each flux-shaping pole piece is cylindrical and coaxial with the cylindrical magnet. Preferably, the pole piece has a frusto-conical face confronting the longitudinal space adjacent the cylindrical face.

30 Claims, 8 Drawing Sheets

LINEARIZED MAGNETIC DISPLACEMENT SENSOR

CROSS-REFERENCE TO RELATED APPLICATION(S)

This application is a continuation-in-part of application Ser. No. 08/906,773 filed Aug. 6, 1997 for "Flux Shaping Pole Pieces for a Magnetic Displacement Sensor" by John P. Dilger and Nile K. Dielschneider and assigned to the same assignee as the present application.

BACKGROUND OF THE INVENTION

The present invention is a magnetic displacement sensor having a magnetic circuit reluctance that is constant with displacement. More specifically, the present invention is a magnetic displacement sensor having improved flux shaping pole pieces for improved performance.

Typically, magnetic displacement sensors include a flux generator that provides a constant source of magnetic flux and a pickup device that measures flux. Typically, the flux generator is mounted to one element and the pickup device is mounted to another element so that the magnetic flux density sensed by the pickup device is based on the displacement between the elements. Magnetic displacement sensors typically measure linear or rotational displacement and provide an output proportional to absolute linear or rotary position displacement of the elements. Magnetic displacement sensors may employ either electromagnets or permanent magnets as a source of magnetic flux. A pickup device (e.g., a magnetoresistor, a magnetodiode, or a Hall effect sensor) intersects the magnetic flux and detects changes in the magnetic field produced by the magnets.

Magnetic displacement sensors are commonly used in cooperation with microprocessors in remote control systems with field devices. For example, magnetic displacement sensors can be used to monitor valve position. Examples of prior art magnetic displacement sensors are found in Prinz et al. U.S. Pat. No. 4,532,810, Wolf et al. U.S. Pat. No. 5,497,081, and Riggs et al. U.S. Pat. No. 5,359,288.

The useful range of prior art magnetic displacement sensors is limited by the magnets' fringing flux. When two permanent magnets are adjacently aligned, the mechanical characteristic of each magnet and its proximity to the other magnet pole face dictate the distribution of magnetic flux from pole face to opposite pole face. The fringing flux appears between the magnetic poles of the two-magnet assembly. Where a single magnet is used as the flux generator, fringing flux extends between the opposite poles of the magnet are is concentrated quite close to and parallel to the magnet. In both cases fringing flux variations along the length of the magnet(s) are non-linear. Therefore, the magnetic field detected by the magnetic displacement sensor varies non-linearly with displacement. This non-linearity results in inaccurate and erroneous sensor readings, limiting the useful range and effectiveness of magnetic displacement sensors.

The two magnet assembly is also susceptible to errors due to relative rotation of the magnet assembly and the sensor. It is typical, for example, to mount the magnet assembly to a moving part whose lineal position is being monitored, and to mount the sensor to stationary housing for connection to control circuitry. If the moving part rotates during control or positioning operations, the magnet assembly might rotate to a position where the magnetic field of the magnet assembly no longer correctly operates the sensor.

BRIEF SUMMARY OF THE INVENTION

The present invention is directed to flux-shaping pole pieces for the magnet pole faces of a magnetic displacement sensor.

One form of the invention is a displacement sensor that senses relative displacement between first and second elements. A magnet assembly is mounted to the first element and defines a longitudinal space having an axis along its length. The magnet assembly includes at least one magnet having a north pole and a south pole that supply fringing magnetic flux in the longitudinal space and a flux-shaping pole piece on each of the north and south poles. The flux-shaping pole pieces have configurations to sculpt fringing magnetic flux in the longitudinal space so that magnetic flux density in the longitudinal space varies substantially linearly along the axis of the space. A magnetic field sensor assembly has a sensor housing for mounting to the second element and a magnetic flux sensor mounted to the sensor housing on the axis of the longitudinal space. In a preferred form of the invention each of the flux-shaping pole pieces has a pentagon shape in a plane of a primary flux pattern in the longitudinal space, the pentagon shape forming a first face confronting the longitudinal space parallel to the axis of the longitudinal space.

In one embodiment of the invention, the magnet is a cylindrical magnet and the longitudinal space is adjacent to and extends along the length of the cylindrical magnet. In this form of the invention, the first face of each flux-shaping pole piece is cylindrical, and the pole piece is oriented so that the cylindrical first face is parallel to and coaxial with the cylindrical magnet. Preferably, the pole piece has a frusto-conical face between the cylindrical face and the second face and confronting the longitudinal space.

In one use of the invention, one of the first and second elements is a valve actuator and valve stem housing and the other of the first and second elements is a stationary housing so that the displacement sensor senses linear displacement between the valve stem and the stationary housing.

Another form of the invention is a flux-shaping pole piece for a pole of a magnet of a magnetic displacement sensor for sensing relative displacement between first and second elements, wherein the magnet forms a longitudinal space substantially parallel to a length of the magnet. The pole piece comprises a magnetic material having an attachment surface for attachment to the pole of the magnet. The pole piece is configured so that when the pole piece is attached to the poles of the magnet, each of the pole pieces sculpt fringing magnetic flux in the longitudinal space so that magnetic flux density in the longitudinal space varies substantially linearly along the axis of the longitudinal space.

In a preferred form of this embodiment of the invention, the magnet is a cylindrical magnet having an axis, and the pole piece has a pentagon shape in a plane of primary flux pattern across the longitudinal space, the pole piece has a cylindrical face confronting the longitudinal space and coaxial to the axis of the magnet when the pole piece is attached to the magnet pole. Preferably, the flux-shaping pole piece includes a frusto-conical face confronting the longitudinal space between the cylindrical face and the attachment surface.

DETAILED DESCRIPTION OF THE PREFERRED EMBODIMENTS

Figure 1:
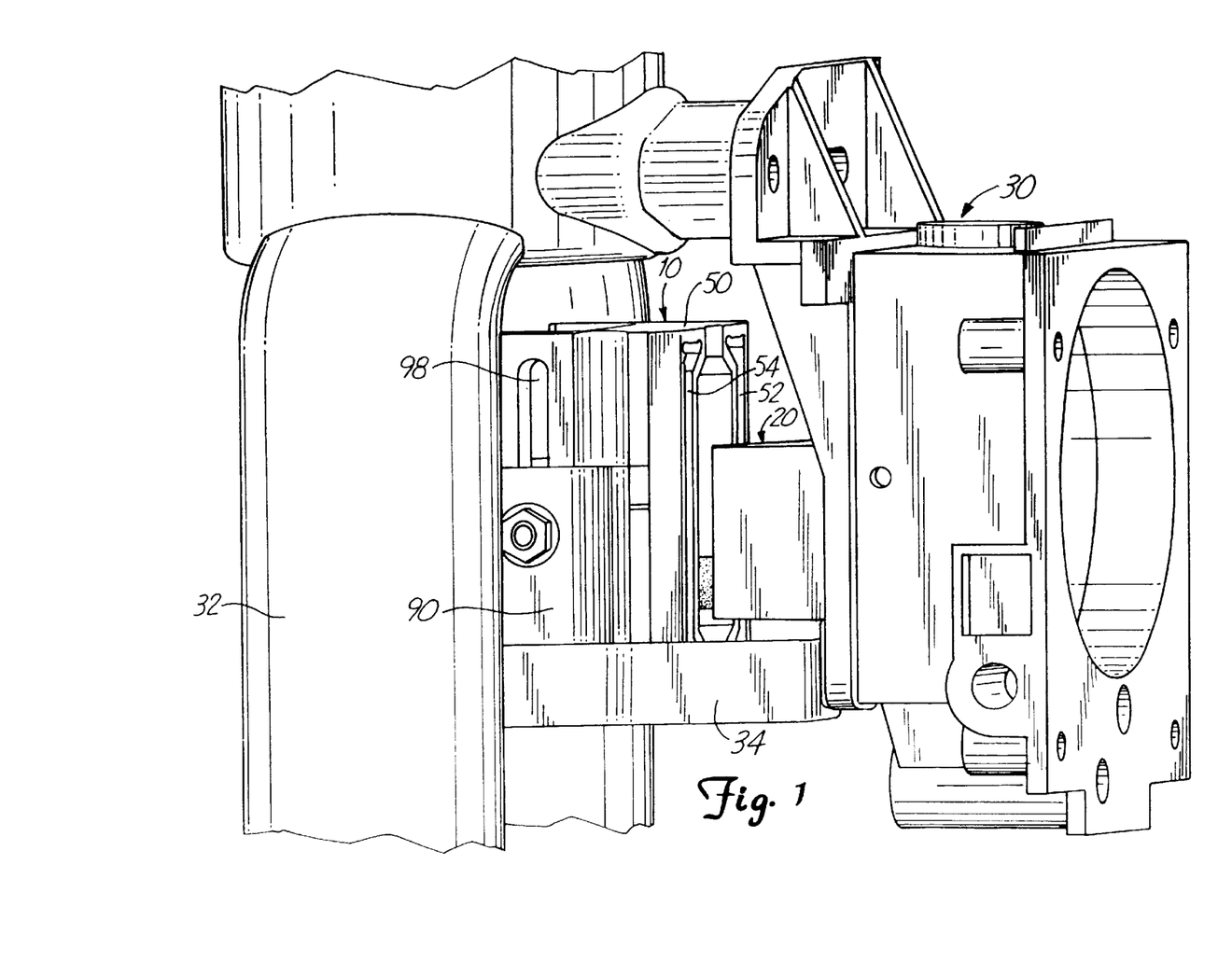
FIG. 1 is a perspective view of a magnetic displacement sensor with flux shaping pole pieces according to one embodiment of the present invention.
Figure 2:
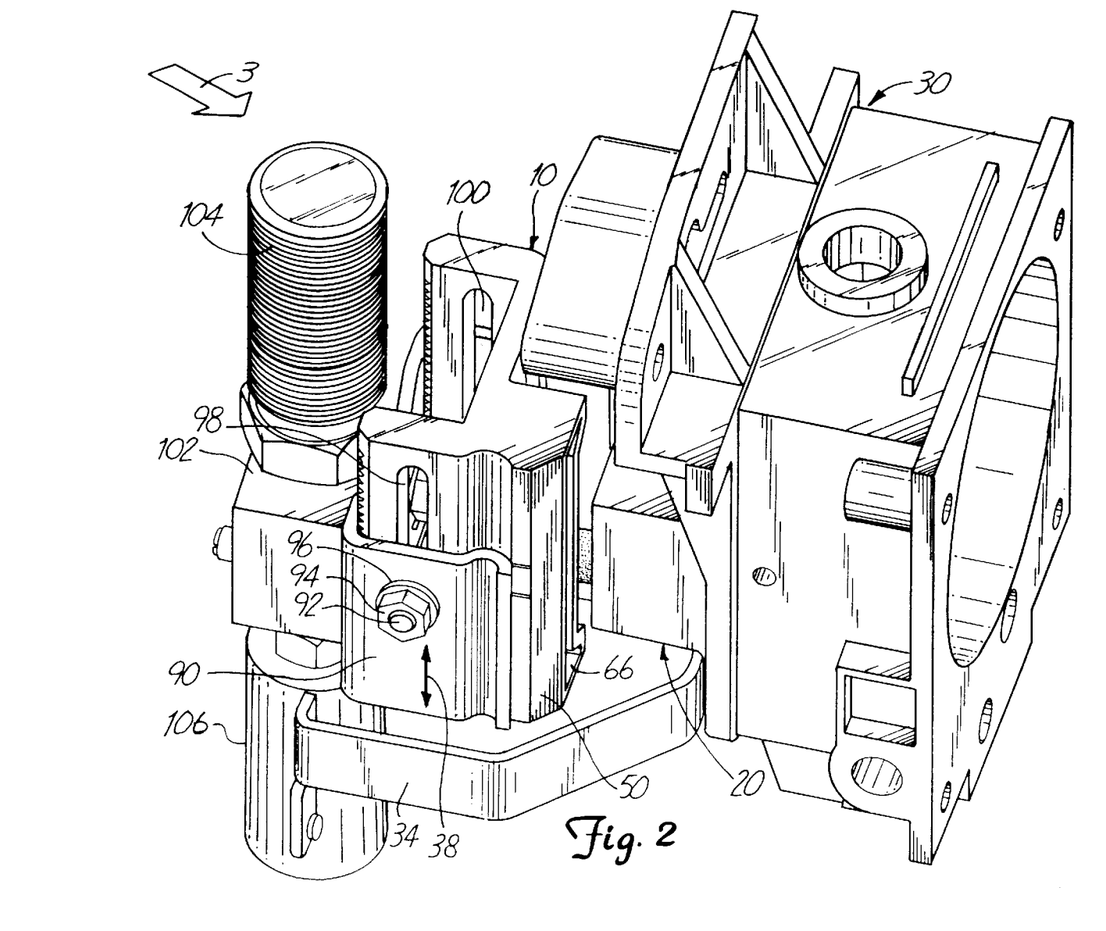
FIG. 2 is an enlarged perspective view, with portions removed for sake of clarity, of the magnetic displacement sensor shown in FIG. 1.

FIG. 1 is a perspective view of a magnetic displacement sensor with flux shaping pole pieces in accordance with a first embodiment of the present invention. The magnetic displacement sensor comprises a movable magnet assembly 10 (shown in greater detail in FIGS. 2–5) and a magnetic field sensor assembly 20. Magnetic field sensor assembly 20 is mounted to a stationary instrument housing 30 and a stationary actuator yoke 32 by mounting arm 34. As shown in FIG. 2, magnet assembly 10 is arranged for linear or reciprocal movement of valve stem 106 in the direction of arrow 38. Stem connector 102 is connected between actuator stem and 104 and valve stem 106. Actuator stem 104 transmits linear movement of a valve actuator, such as a pressure-responsive diaphragm (not shown) to valve stem 106, which in turn operates a valve plug (not shown) in a manner well known in the art to open and close the valve under control.

As shown particularly in FIGS. 2–5, magnet assembly 10 comprises a housing 50 supporting permanent bar magnets 52 and 54 in cavities 64 and 66. As shown particularly in FIG. 5, magnets 52 and 54 are arranged so that one of the magnets, such as magnetic 52, has its north pole 56 orientated towards the top of housing 50 and its south pole 58 orientated toward the bottom of housing 50. The other magnet, such as magnet 54, is oriented opposite to magnet 52 with its north pole 62 at the bottom of housing 50 and its south pole 60 at the top of housing 50. Housing 50 orients magnets 52 and 54 so that confronting surfaces 57 are parallel to each other and to longitudinal line 81 in the longitudinal space between the magnets. Although magnets 52 and 54 may be electromagnets or permanent magnets, a permanent magnet is preferred because it can be easily incorporated into the sensor and does not require a separate power source. Magnets 52 and 54 are preferably Alnico V magnets. It will be appreciated that magnets 52 and 54 are a constant magnetic flux source.

Figure 5:
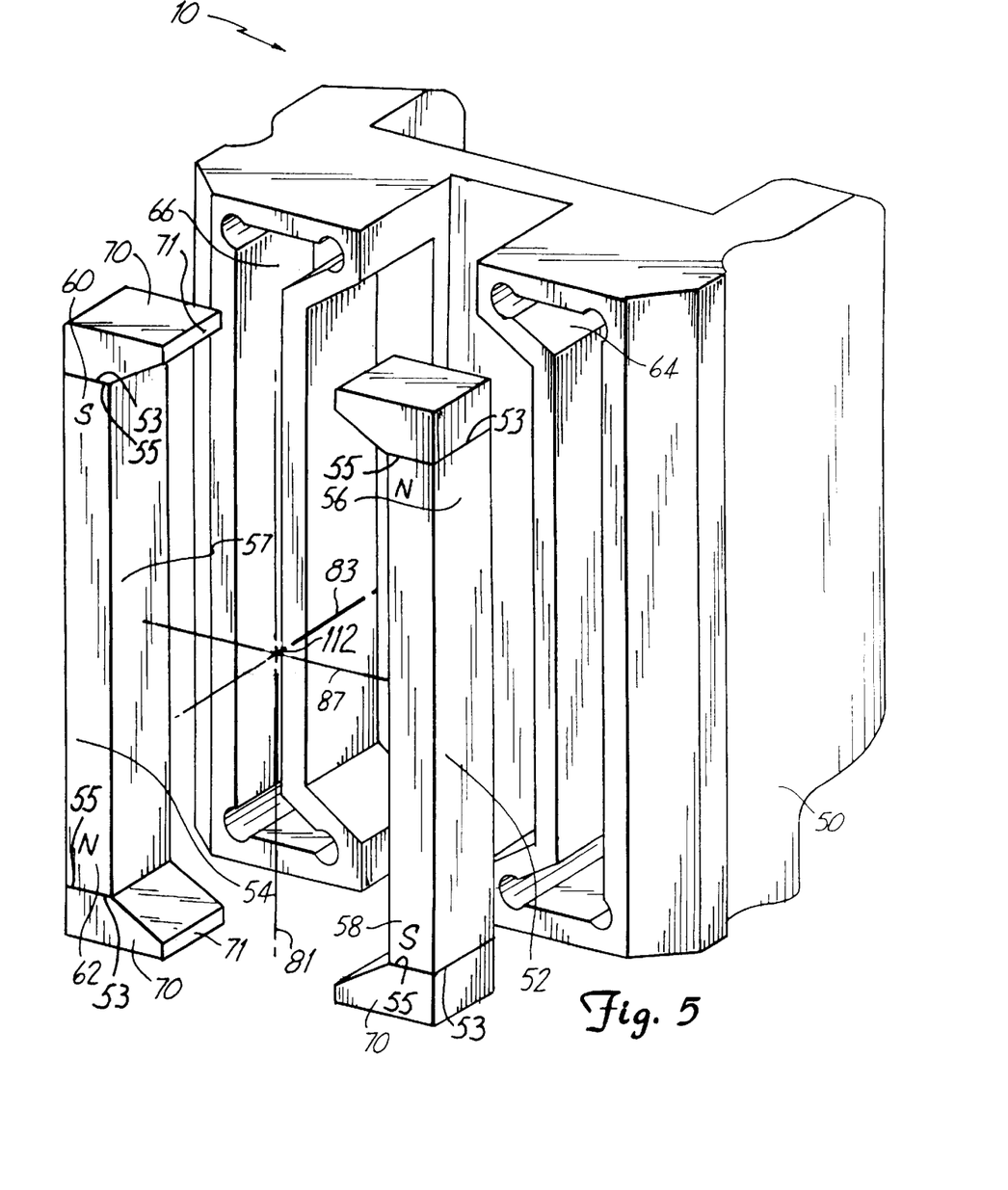
FIG. 5 is an exploded view of the magnet block assembly shown in FIGS. 3 and 4.

As shown particularly in FIG. 5, a flux shaping pole piece 70 is appended to each of poles 56, 58, 60, and 62 of magnets 52 and 54. Pole pieces 70 may be composed of any suitable magnetic material, such as G10100 cold-rolled steel. Because the pole pieces are magnetic, the magnetic force exhibited about magnets 52 and 54 holds pole pieces 70 in contact with the magnet poles, and epoxies, adhesives, or similar substances are not required. Alternatively, an adhesive may be employed to attach pole pieces 70 to the respective magnetic pole.

In an alternative embodiment of the present invention, flux shaping pole pieces 70 are not separate components from magnets 52 and 54, but are an integral part of the magnets themselves. Thus, magnets 52 and 54 can be cast with pole pieces 70 integrated as part of the magnets. In such an embodiment, each magnet (with pole pieces) is the singular component that is placed in cavities 64 and 66 of housing 50.

Pole pieces 70 provide optimal magnetic displacement sensor performance. Typically, magnets display fringing flux at the poles, resulting in non-linear flux variations that cause inaccurate or erroneous magnetic displacement sensor performance. Pole pieces 70 "sculpt" the magnetic flux to provide a linear change in flux density. By sculpting the fringing flux, pole pieces 70 linearize the flux measurements over the length of the magnets, thereby dramatically increasing the useful range of the magnets and the magnetic displacement sensor.

Figure 7:
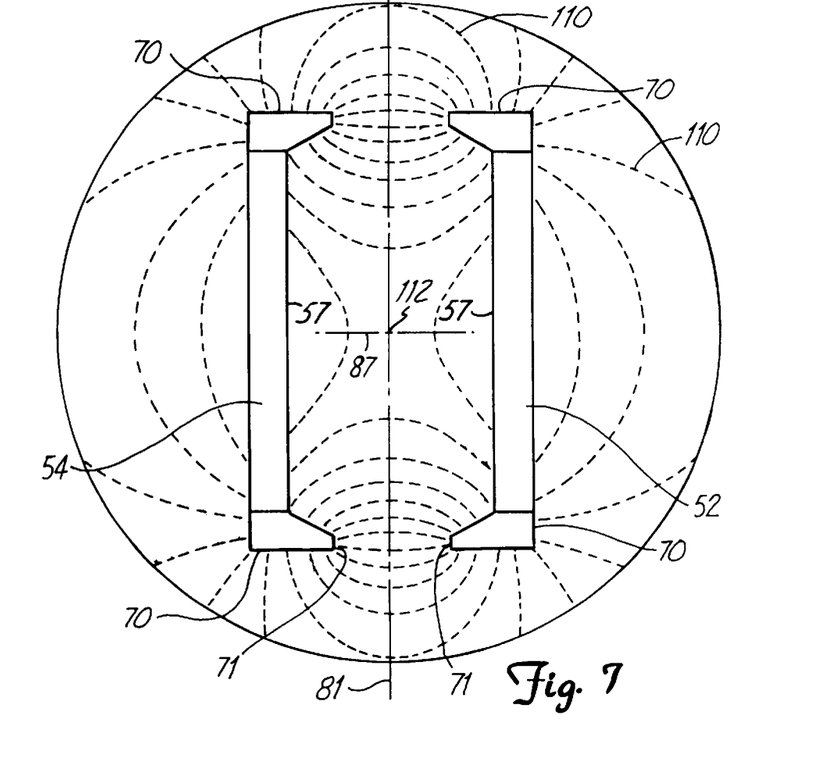
FIG. 7 is a diagram illustrating the magnet block assembly shown in FIGS. 3–5 and the associated flux pattern.

As shown particularly in FIGS. 5 and 7, pole pieces 70 have a pentagon shape, when viewed in the plane of the primary flux pattern (FIG. 7), having two pairs of parallel surfaces normal to each other. The narrow surface 71 of the pentagon forms a narrow face that is significantly wider across the primary flux pattern (into the paper of FIG. 7 and along line 83 in FIG. 5) than in the direction along the length of magnets 52 and 54. More particularly, we have experimentally determined that the pentagon shape of pole pieces 70 optimizes linear performance over the full length of the magnets of the magnetic displacement sensor. The size of the pentagon pole pieces 70 is based on the separation distance between magnets 52 and 54, the length of the magnets, and the cross-section area of the magnets. Thus, different magnet sizes and spacing require different pole piece pentagon size.

It is important to the present invention that face 71 of the respective pentagon pole pieces 70 be parallel to surface 57 of the respective bar magnet 52 and 54. If a face 53 of a pole of magnet is not perpendicular to the surface 57 of the respective magnet, it may be necessary to insert a magnetic shim or other spacer (or even an adhesive) between face 53 of the magnet and face 55 of the respective pole piece 70 to be certain that face 71 is parallel to surface 57 of the magnet. Hence, if the pole face 53 is nicked or otherwise damaged to provide a face not perpendicular to the length of the magnet, repair by shims may render the magnet usable.

Figure 3:
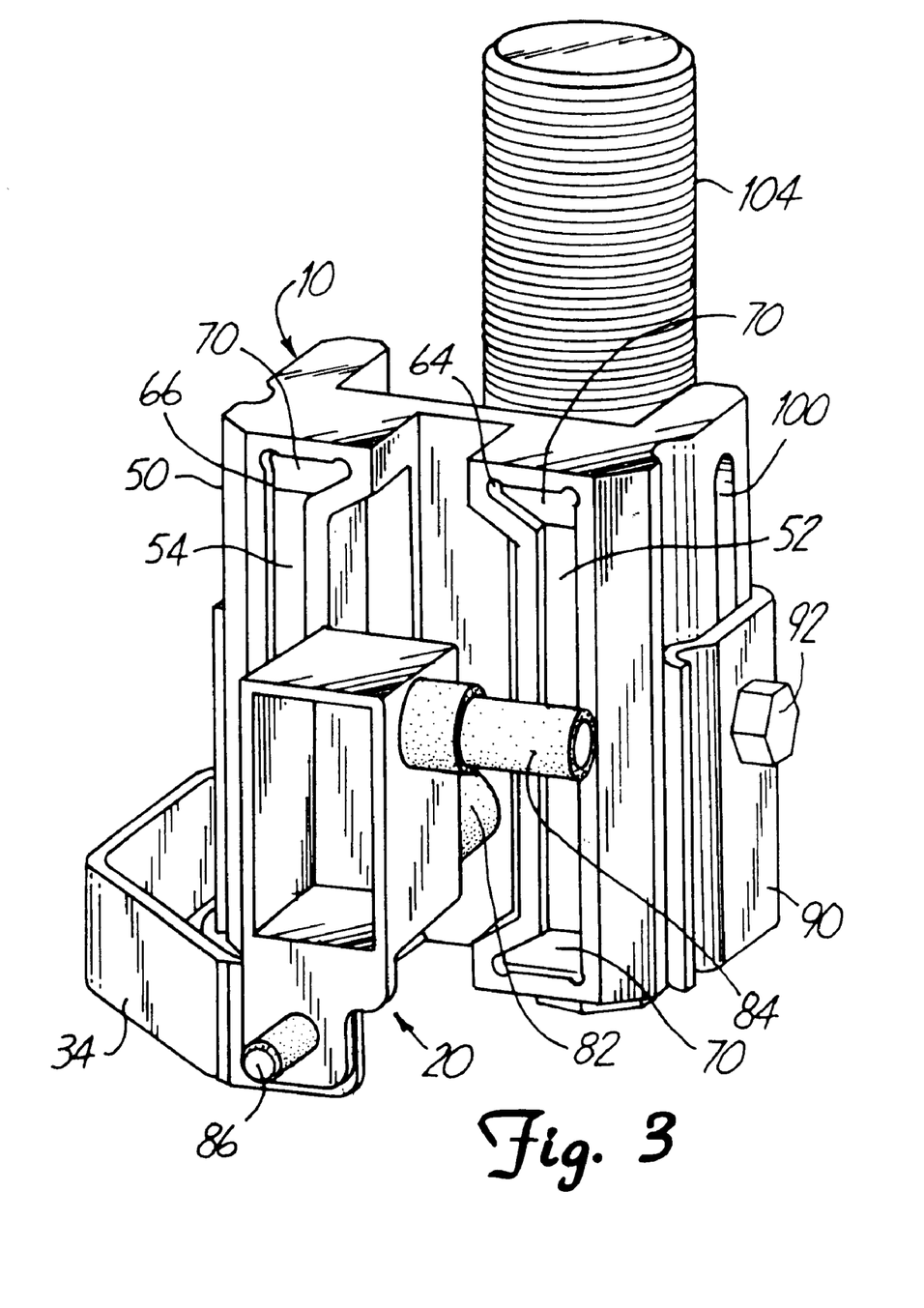
FIG. 3 is a perspective view of a magnet block assembly and a magnetic field sensor assembly of the magnetic displacement sensor taken generally in the direction of arrow 3 in FIG. 2.
Figure 4:
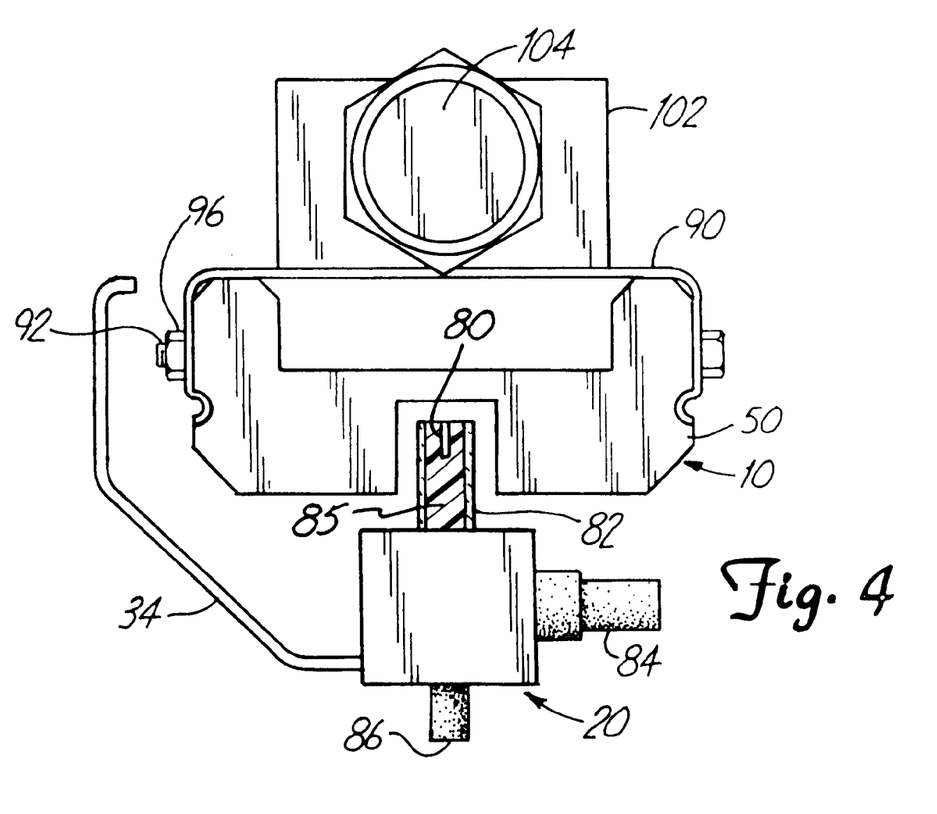
FIG. 4 is a top view of the assemblies shown in FIG. 3.

As illustrated particularly in FIGS. 3 and 4, magnetic field sensor assembly 20 includes a ceramic cylinder 82 which extends between magnets 52 and 54 in housing 50. Cylinder 82 contains a magnetic field sensor 80, such as a Hall effect sensor, placed in proximity to magnet assembly 10 between magnets 52 and 54. Magnetic field sensor 80 is mounted within cylinder 82 by an acetal plastic bushing 85, keyed to precisely position sensor 80 within cylinder 82 to within 0.002 inches. Cylinder 84 plugs into instrument housing 30 (FIGS. 1 and 2) and permits the feed through for the wiring for electronics. In one form of the invention, housing 30 is formed of a suitable non-magnetic material such as aluminum or rigid plastic. Non-magnetic fastener 86 mounts the housing of sensor assembly 20 to housing 30, and mounting arm 34 mounts housing 30 to stationary actuator yoke 32.

As shown in FIG. 2, housing 50 of magnet assembly 10 is attached to bracket 90 by pin bolts 92, washers 94 and nuts 96) fastened through respective slots 98 and 100 in housing 50. Additionally, bracket 90 is connected to a stem connector 102 that couples a threaded actuator stem 104 to a valve stem 106 of a valve. Hence, magnet assembly 10 is rigidly mounted to the valve stem/actuator assembly of the valve whose position is being monitored by the displacement sensor of the present invention. As valve stem 106 moves in the direction of arrow 38, stem connector 102 and bracket 90 move magnet assembly 10 relative to magnetic field sensor assembly 20. Magnetic field sensor 80 (FIG. 6) remains stationary because it is coupled to stationary actuator yoke 32 and instrument housing 30. Movement of magnet assembly 10 in the direction of arrow 38 causes a relative displacement between the magnet assembly and magnetic field sensor 80 within magnetic field sensor assembly 20. Thus, the magnetic flux density through magnetic field sensor 80 varies with displacement of actuator 104 and valve stem 106.

Figure 6:
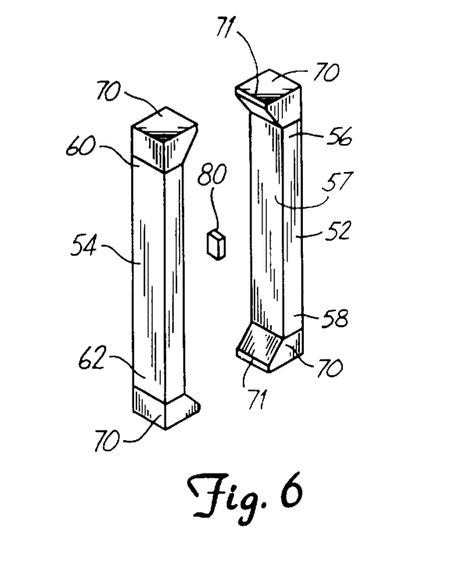
FIG. 6 is perspective view, with portions not shown for sake of clarity, of the magnets of the magnet block assembly of FIGS. 3–5 illustrating a magnetic field sensor between the magnets.

FIG. 6 illustrates a perspective view of magnetic field sensor 80 located between magnets 52 and 54 appended with flux shaping pole pieces 70, and FIG. 7 illustrates the magnetic flux lines 110 between magnets 52 and 54. Preferably, magnets 52 and 54 are of equal magnetic strength, so that line 81 is centered between and parallel to surfaces 57 of magnets 52 and 54, line 83 is orthogonal to line 81 in a direction along the width of surfaces 57, and line 83 intersects line 81 at midpoint 112 centered between the pole pieces and centered between the edges of magnets 53 and 54 along the width of surfaces 57 (FIGS. 5 and 7). At point 112, the magnetic flux density is at a null (zero). The sensor is calibrated by placing sensor 80 at the midpoint 112 where magnetic field strength is zero and calibrating the sensor.

Along longitudinal line 81 between the magnets, the flux density increases uniformly from the midpoint of the assembly toward the poles, to a maximum flux density directly between pole faces 71. Because the poles are oppositely oriented, the flux directions are opposite at the regions along line 81 on each side of the midpoint. Hence, the flux density varies along line 81 from a maximum in one direction between one set of pole faces, through zero at midpoint 112, to a maximum in the opposite direction between the other set of pole faces. In use, magnetic field sensor 80 is oriented midway between magnets 52 and 54 on line 81 so that as the magnet assembly reciprocates in the direction of arrow 38 (FIG. 2) parallel to line 81, sensor 80 crosses the flux pattern between the slide-by magnets and produces a voltage proportional to the relative position of magnetic field sensor 80 in relation to magnet assembly 10. By sculpting the fringing flux, pole pieces 70 linearize the flux measurements over the length of the magnets. Thus, pole pieces 70 dramatically increase the useful range and accuracy of the voltage readings produced by magnetic field sensor 80.

One difficulty with the magnet assembly of the embodiment of FIGS. 3–7 arises where the displacement sensor is used in environments where relative rotation of the parts might occur about an axis parallel to line 81. More particularly, if magnet assembly 10 moves in a direction parallel to line 83 (FIG. 5), which is tangent to an arc of rotation about an axis parallel to line 81, the magnet assembly may move out of operative association to sensor 80 such that sensor 80 is no longer in the linearly variable flux density pattern of the magnet assembly. The magnet assembly of FIGS. 8 and 9 overcomes this difficulty by providing an arrangement that is insensitive to relative rotation of the elements.

Figure 8:
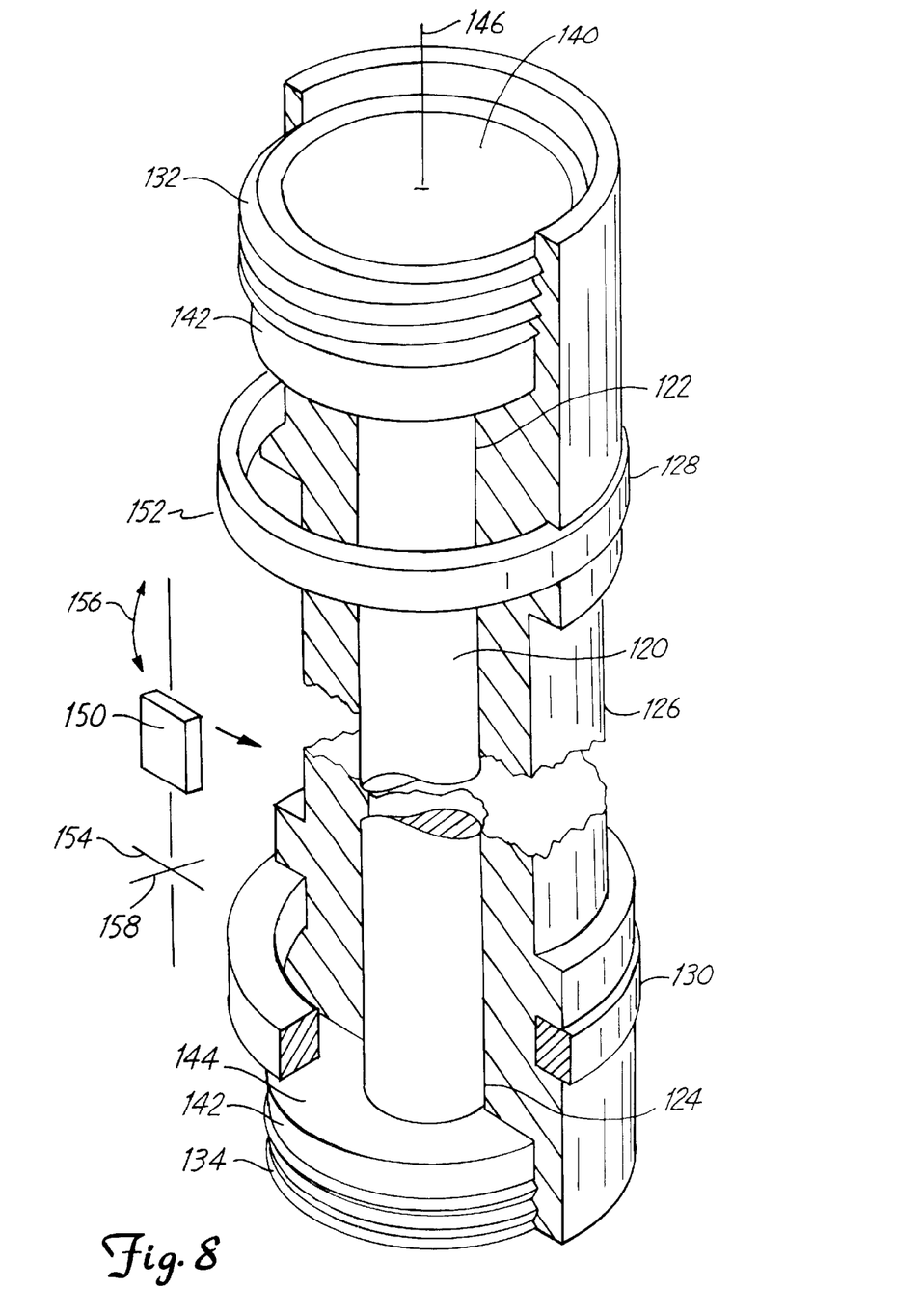
FIG. 8 is a perspective view, partly in cutaway cross-section, of a magnet block assembly according to a preferred embodiment of the present invention, illustrating a magnetic field sensor in relation to the magnet assembly.
Figure 9:
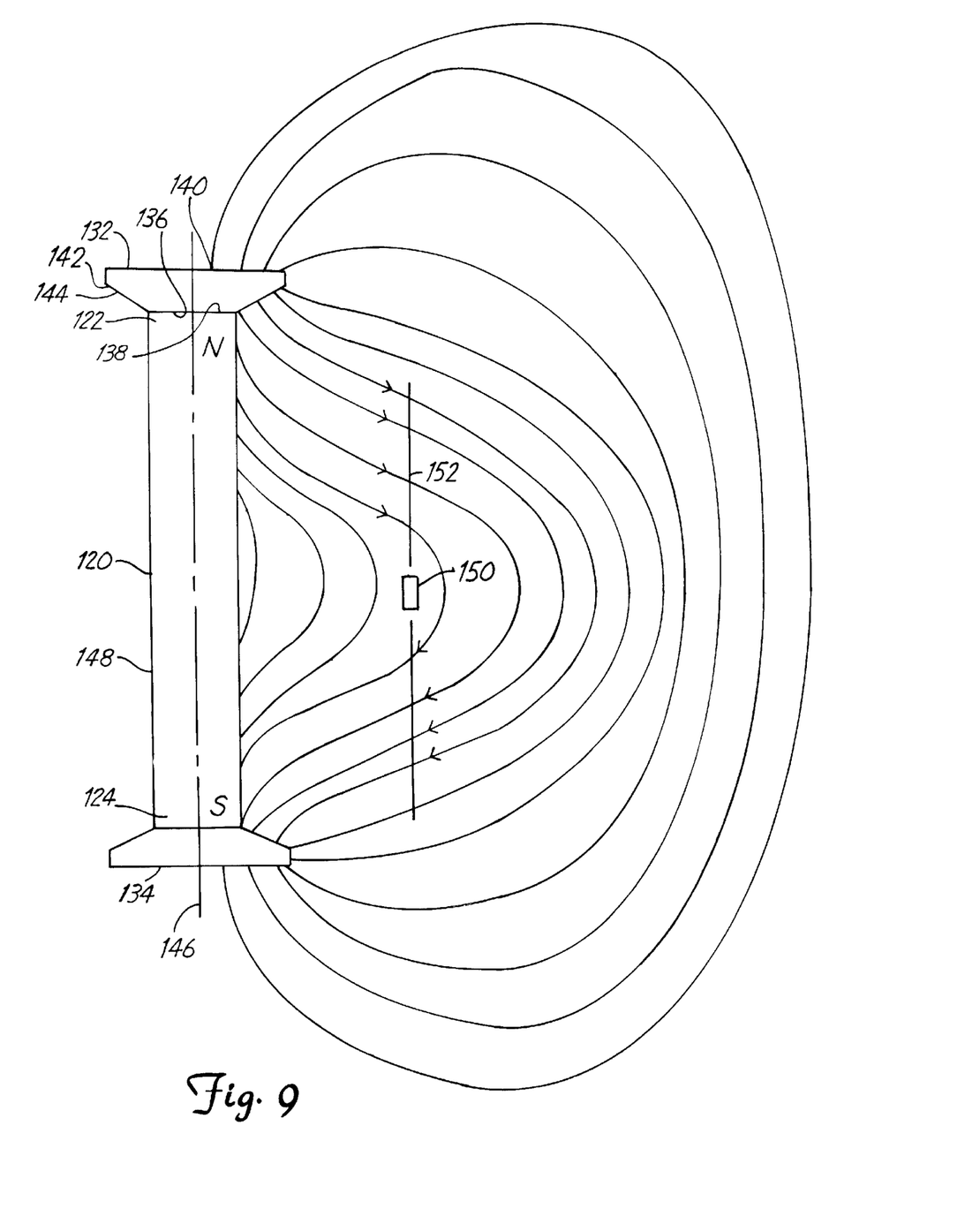
FIG. 9 is a diagram illustrating the magnet assembly shown in FIG. 8 and the associated flux pattern.

FIG. 8 illustrates a single bar magnet 120, preferably having a cylindrical shape, having a north pole 122 and a south pole 124. Magnet 120 is preferably a permanent magnet constructed of Alnico V magnetic material that serves as a constant magnetic flux source for this embodiment of the magnetic displacement sensor. Magnet 120 is supported within a non-magnetic housing 126 which is preferably constructed of aluminum or ceramic. Housing 126 may conveniently be a two-piece or clam-shell housing held together by non-magnetic rings 128 and 130 or other suitable fastener. Like housing 126, rings 128 and 130 or other fastener may be constructed of aluminum or ceramic. Flux shaping pole pieces 132 and 134 are threadably fastened to opposite ends of housing 126 and each includes a face 136 arranged to confront and abut opposite end pole faces 138 of magnet 120 (FIG. 9). Pole pieces 132 and 134, which are composed of a suitable magnetic material such as G10100 cold-rolled steel, are preferably generally cylindrical in shape having opposite parallel circular surfaces 136 and 140 and a cylindrical surface 142 arranged to confront a longitudinal space containing the sensor 150. A frusto-conical surface 144 forms a transition between surfaces 136 and 142 and also confronts the longitudinal space.

In a preferred embodiment of the invention, magnet 120 has a diameter of about 0.375 inches and a length of about 2.5 inches. The diameter of circular faces 136 on pole pieces 132 and 134 is about 0.375 inches and cylindrical surface 142 has a diameter of about 0.8125 inches and a length along axis 146 of about 0.125 inches. Frusto-conical surface 144 is arranged at an angle of about 20° to surface 136. Magnetic field sensor 150 is mounted to the valve housing or other stationary object as previously described and is arranged to move along axis 152 parallel to axis 146 and passing through the sensor. For a sensor arrangement as described, axis 152 is 0.625 inches from axis 146.

It is important to the present invention that cylindrical surface 142 is parallel to and coaxial with axis 146 and surface 148 of magnet 120. This relationship is accomplished by the circular face 136 on the pole piece confronting the circular pole face 138 of the magnet and the coaxial relationship of surfaces 136 and 142. As a result of this condition, the magnetic field flux is symmetrically configured about the axis 146 of the magnet. As shown in FIG. 9, the length of magnet 120 in a direction along axis 146 and the configuration of cylindrical surface 142 and frusto-conical surface 144 sculpt the fringing magnetic flux pattern in a region adjacent magnet 120 so that the magnetic flux varies linearly along axis 152 parallel to axis 146. Therefore, magnetic displacement sensor 150 senses a flux density that varies linearly along the length of travel of the sensor. Because the magnetic flux is uniform about the periphery of the magnet, the sensor is insensitive to relative rotation of the elements about axis 146. Hence, the sensor is insensitive to rotation of magnet 120 about its axis 146 that would cause relative movement of sensor 150 along arc 156.

The flux density increases uniformly along longitudinal line 152 parallel to the magnet from the midpoint 158 of the assembly toward the poles, to a maximum flux density directly opposite pole faces 142. Because poles 122 and 124 are oppositely oriented, the flux directions through sensor 150 are in opposite directions at the regions along line 152 on each side of the midpoint 158. Hence, the flux density varies along line 152 from a maximum in one direction adjacent a pole face 142 adjacent one pole 122, through zero at midpoint 158, to a maximum in the opposite direction adjacent the pole face 142 adjacent the other pole 124. At midpoint 158 centered between the pole pieces, the magnetic flux density is at a null (zero). The sensor is calibrated by placing sensor 150 at the midpoint 158 where magnetic field strength is zero and calibrating the sensor.

In use, magnetic field sensor 150 reciprocates along line 152 and crosses the linearly-varying flux pattern of magnet 120 to produce a voltage proportional to the relative position of magnetic field sensor 150 in relation to magnet assembly 120. By sculpting the fringing flux, pole pieces 132 and 134 linearize the flux over the length of the magnet. Thus, pole pieces 132 and 134 dramatically increase the useful range and accuracy of the voltage readings produced by magnetic field sensor 150.

Although the present invention has been described with reference to preferred embodiments, workers skilled in the art will recognize that changes may be made in form and detail without departing from the spirit and scope of the invention.

What is claimed is:

1. A displacement sensor for sensing relative displacement along a substantially parallel path between first and second elements comprising:
    a magnet assembly for mounting to the first element, the magnet assembly having a longitudinal space along and about a longitudinal axis of the first element parallel to the parallel path, the magnet assembly including
        a magnet producing a generally radially symmetric magnetic field that is coaxil with the longitudinal axis of the first element, the magnet having a north pole and a south pole that supply magnetic flux throughout the longitudinal space, and
        a flux-shaping pole piece on each of the north and south poles, the flux-shaping pole pieces having configurations to sculpt the magnetic flux so that magnetic flux density varies substantially linearly along the path; and
    a magnetic flux sensor mounted to the second element for detecting variations in magnetic flux indicative of the relative displacement between the first and second elements.

2. The displacement sensor of claim 1, wherein each of the flux-shaping pole pieces is a metal pole piece appended to a respective pole of the magnet.

3. The displacement sensor of claim 2, wherein the pole pieces are attached to the respective pole by a magnetic force exhibited by the magnet.

4. The displacement sensor of claim 1, wherein each of the flux-shaping pole pieces is integral to the magnet.

5. The displacement sensor of claim 1, wherein the magnet is a bar magnet having a length with the poles at opposite ends thereof, wherein the longitudinal space is adjacent to and extends along the length of the bar magnet.

6. The displacement sensor of claim 1, wherein each of the flux-shaping pole pieces has a hexagon shape in a plane of a primary flux pattern in the longitudinal space, the hexagonal shape forming a first surface confronting the longitudinal space parallel to the axis of the longitudinal space.

7. The displacement sensor of claim 6, wherein each of the flux-shaping pole pieces is a metal pole piece appended to a respective pole of the magnet.

8. The displacement sensor of claim 1, wherein each of the poles has a pole face substantially perpendicular to the length of the magnet, and each of the flux-shaping pole pieces is a metal pole piece having a first surface confronting the longitudinal space and a second surface appended to a respective pole face, the second surface being perpendicular to the first surface, and the pole piece being oriented on the respective pole so that the first surface is parallel to the length of the magnet.

9. The displacement sensor of claim 8, including a third surface confronting the longitudinal space between the first and second surfaces, the third being acutely positioned from an axis parallel to the longitudinal space.

10. The displacement sensor of claim 8, wherein the magnet is a bar magnet having a length with the poles at opposite ends, wherein the longitudinal space is adjacent to and extends along the length of the bar magnet.

11. The displacement sensor of claim 10, wherein the bar magnet is cylindrical in shape and the first surface of each flux-shaping pole piece is cylindrical.

12. The displacement sensor of claim 10, wherein each of the flux-shaping pole pieces is a metal pole piece appended to a respective pole of the bar magnet.

13. The displacement sensor of claim 10, wherein the bar magnet has cylindrical shape and each of the poles has a circular pole face substantially perpendicular to the length of the cylindrical magnet, each of the flux-shaping pole pieces is a metal pole piece having a circular face appended to a respective circular pole face, the first surface of each flux-shaping pole piece is cylindrical and the perpendicular to the circular face, the pole piece being oriented on the respective pole so that the cylindrical first surface is parallel to and coaxial with the cylindrical bar magnet.

14. The flux-shaping pole piece of claim 13, including a frusto-conical surface confronting the longitudinal space between the cylindrical surface and the circular face.

15. The displacement sensor of claim 13, wherein each of the flux-shaping pole pieces is a metal pole piece appended to a respective pole of the cylindrical magnet.

16. The displacement sensor of claim 8, wherein one of the first and second elements is a valve actuator and valve stem housing and the other of the first and second elements is a stationary housing, whereby the displacement sensor senses linear displacement between the valve stem and the stationary housing.

17. The displacement sensor of claim 1, wherein one of the first and second elements is a valve actuator and valve stem housing and the other of the first and second elements is a stationary housing, whereby the displacement sensor senses linear displacement between the valve stem and the stationary housing.

18. The displacement sensor of claim 1, wherein the magnet assembly includes a magnet assembly housing and the magnet is mounted to the magnet assembly housing.

19. The displacement sensor of claim 1, wherein the magnet assembly includes a magnet assembly housing and the magnet is a cylindrical magnet mounted to the magnet assembly housing, the axis of the longitudinal space along which the magnetic flux density varies substantially linearly is adjacent substantially parallel to the length of the cylindrical magnet.

20. A flux-shaping pole piece for a pole of a magnet of a magnetic displacement sensor for sensing relative displacement along a substantially parallel path between first and second elements, wherein the magnet is to be arranged to form a longitudinal space in which the parallel path is substantially parallel to a length of the magnet, the pole piece comprising:
    a magnetic material having an attachment surface arranged to attach to the pole of the magnet, and
    a configuration so disposed and arranged so that when a pole piece is coaxially attached to the poles of the magnet each of the pole pieces sculpt magnetic flux in the longitudinal space so that magnetic flux density is generally radially symmetric through the longitudinal space and varies substantially linearly along the path.

21. The flux-shaping pole piece of claim 20, wherein the flux-shaping pole piece is a metal pole piece for appending to a pole of the magnet.

22. The flux-shaping pole piece of claim 21, wherein the pole piece is designed to be held in contact with the magnet pole by a magnetic force exhibited by the magnet.

23. The flux-shaping pole piece of claim 20, having a hexagonal shape in a plane of primary flux pattern across the longitudinal space arranged to form a first surface confronting the longitudinal space and parallel to the axis the longitudinal space when the pole piece is attached to the magnet pole.

24. The flux-shaping pole piece of claim 23, including a second surface confronting the longitudinal space between the first surface and the attachment surface.

25. The flux-shaping pole piece of claim 23, wherein the first surface is arranged parallel to the length of the magnet when the pole piece is attached to the magnet pole.

26. The flux-shaping pole piece of claim 25, wherein the attachment surface is perpendicular to the first surface, the attachment surface orienting the pole piece on the pole so that the narrow face is parallel to the length of the magnet.

27. The flux-shaping pole piece of claim 20, wherein the magnet is a cylindrical bar magnet having an axis, and the pole piece has first surface confronting the longitudinal space in a plane of primary flux pattern across the longitudinal space when the pole piece is attached to the magnet pole.

28. The flux-shaping pole piece of claim 27, wherein the flux-shaping pole piece is a metal pole piece and the first surface is cylindrical, the pole piece having a circular face perpendicular to the cylindrical first surface for attachment to a pole face of the magnet to orient the pole piece so that the cylindrical first surface is coaxial with the magnet.

29. The flux-shaping pole piece of claim 27, including a frusto-conical surface confronting the longitudinal space between the cylindrical surface and the circular face.

30. In a displacement sensor for sensing relative displacement along a substantially parallel path between first and second elements in which a magnet assembly arranged to be mounted to the first element to define a longitudinal space having a central axis parallel to the parallel path and a magnetic field sensor is arranged to be mounted to the second element in the longitudinal space so that relative movement between the first and second elements causes the magnetic field sensor to move relative to the magnet assembly along the central axis, the magnet assembly including:

a cylindrical bar magnet having a north pole and a south pole that supply magnetic flux in the longitudinal space, and means on the poles to sculpt magnetic flux in the longitudinal space so that magnetic flux density is generally symmetrically distributed in planes approximately perpendicular to the central axis, the magnetic flux varying substantially linearly along the path in the presence of relative rotation about the central axis.

* * * * *

UNITED STATES PATENT AND TRADEMARK OFFICE
CERTIFICATE OF CORRECTION

PATENT NO. : 6,515,474 B1
DATED : February 4, 2003
INVENTOR(S) : Nile K. Dielschneider et al.

It is certified that error appears in the above-identified patent and that said Letters Patent is hereby corrected as shown below:

<u>Column 7,</u>
Line 46, delete "hexagon", insert -- hexagonal --

<u>Column 10,</u>
Line 3, delete "claim 27", insert -- claim 28 --

Signed and Sealed this

Ninth Day of September, 2003

JAMES E. ROGAN
*Director of the United States Patent and Trademark Office*